United States Patent
Egawa et al.

[11] 3,863,165
[45] Jan. 28, 1975

[54] METHOD AND APPARATUS FOR ADJUSTING ZERO POINT AUTOMATICALLY

[75] Inventors: Mitsuru Egawa; Tomoteru Takano, both of Tokyo, Japan

[73] Assignee: Tokyo Seimitsu Co., Ltd., Tokyo, Japan

[22] Filed: Sept. 1, 1971

[21] Appl. No.: 176,883

[30] Foreign Application Priority Data
Sept. 3, 1970 Japan.............................. 45-76786

[52] U.S. Cl........................... 330/2, 330/35, 330/69, 330/103, 330/97
[51] Int. Cl.............................................. G01r 19/00
[58] Field of Search............ 330/151, 103, 51, 11, 2

Primary Examiner—Nathan Kaufman
Attorney, Agent, or Firm—Maleson, Kimmelman & Ratner

[57] ABSTRACT

According to the present invention, the measurement which includes a step of converting a quantity of mechanical displacement into an electrical quantity is carried out by using the steps of (a) a zero adjust circuit storing a standard electric quantity of the work in a capacitor included therein, (b) in this condition the output of the zero adjust circuit being adjusted to zero, (c) an electrical quantity to be measured being compared with said standard value stored in said capacitor and the value proportional to the deviation between the standard value and the value to be measured being obtained on the output terminal of the zero adjust circuit.

2 Claims, 7 Drawing Figures

Patented Jan. 28, 1975

3,863,165

METHOD AND APPARATUS FOR ADJUSTING ZERO POINT AUTOMATICALLY

The present invention relates to a method and an apparatus for adjusting the zero adjust circuit to zero automatically in a simple and a quick manner.

Recently, a requirement for greater accuracy of the measuring apparatus has arisen and the number of measurements per unit time has increased, and thus the wear and tear of the feeler included in the gauge head has become serious problem. According to the present invention, the zero point of the measuring apparatus can be settled only by inserting a master into the detector of the measuring apparatus.

Further, in the case of a multi-points measurement, by using the present invention, the zero points of a number of gauge heads can be all adjusted in a very short time.

In a measuring apparatus which measures the d.c. component of the signal, such as an electro-micrometer, it is necessary to adjust the zero point in the indicating meter. In the electro-micrometer, a work having a standard dimension is, in the first place, measured, and next, the indicating value of said work adjusted to the zero point, and then a deviation of the work to be measured from the said standard dimension is indicated in the said electro-micrometer.

One conventional method for adjusting a zero point in the above situation is carried out by observing the value of the electro-micrometer and adjusting the zero adjust dial manually to bring that value to zero. Although this method can be carried out cheaply, the zero adjustment when carried out manually, is troublesome and very time consuming.

A conventional method for adjusting the zero point automatically uses a servo-control for a measuring apparatus. However, the drawbacks of this method are that a servo-amplifier and a driving mechanism are needed which are costly, and a differential coil is operated in an unstable condition because there is no servo-loop during the measuring time.

An object of the present invention is to overcome the drawbacks of the conventional methods.

A further object of the present invention is to provide a precise and fast method and apparatus for adjusting the zero point automatically.

A still further object of the present invention is to provide a method and apparatus which stores an electric analog quantity, converted from a mechanical quantity of a displacement of a standard work, in a capacitor, compares this stored value with a measured value and adjusts to the zero value automatically.

Further features and advantages of the present invention will be apparent from the ensuing description with reference to the accompanying drawings to which, however, the scope of the invention is in no way limited.

Figure 1:
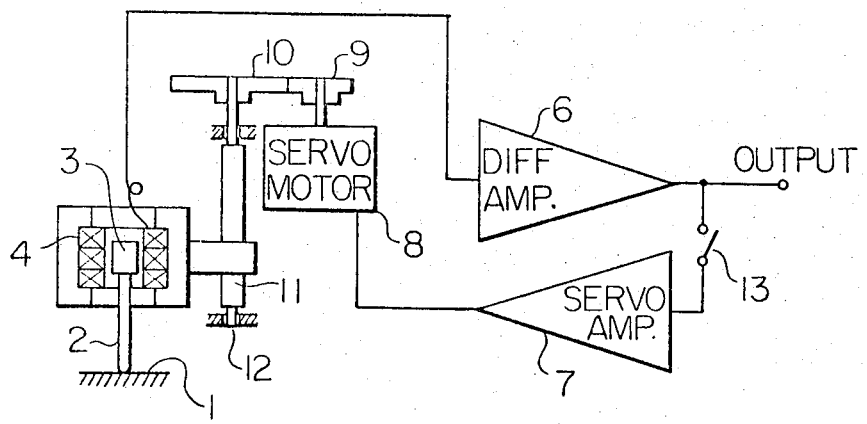
FIG. 1 is a conventional apparatus for adjusting the zero point automatically.

Referring to FIG. 1, a work 1 having a standard dimension is positioned under a measuring element 2 hereinafter referred to a "feeler 2" of a detecting apparatus. The feeler 2 displaces upwardly or downwardly in accordance with the dimension of the said work 1, then, at the same time, the magnetic core 3 fixed to the feeler 2 also displaces with it. The magnetic core 3 and a differential coil 4 constitute a differential transformer, and said differential transformer generates an electric signal which is proportional to the amount of displacement of the magnetic core 3 relative to the differential coil 4. This generated signal is amplified by a differential amplifier 6, and supplied to an output terminal. At the same time, the output of the differential amplifier 6 is sent via a switch 13 to a servoamplifier 7. When the switch 13 is closed, said output of the differential amplifier is amplified by the servo-amplifier 7 and causes a servo-motor 8 to run. When the servo-motor 8 begins to rotate, gears 9, 10 and a lead screw 11 are also rotated thereby displacing the differential coil 4 of the differential transformer. When the relative displacement of the magnetic core 3 to the differential coil 4 becomes zero, that is, the output of the differential coil becomes zero, the servo-motor 8, gear 9, 10 and lead screw 11 all stop. This kind of servo-control is a well-known art, and the gears and the lead screw can be replaced by other means. After this zero adjustment is completed using a work having the standard dimension as mentioned above, the switch 13 is opened, the servo-loop is opened, and then the signal which is proportional to the displacement of the feeler 2 appears as an output signal of the differential transformer. In this method, the servo-loop is not used during the measuring time, so that the differential coil operates in an unstable condition.

Figure 2:
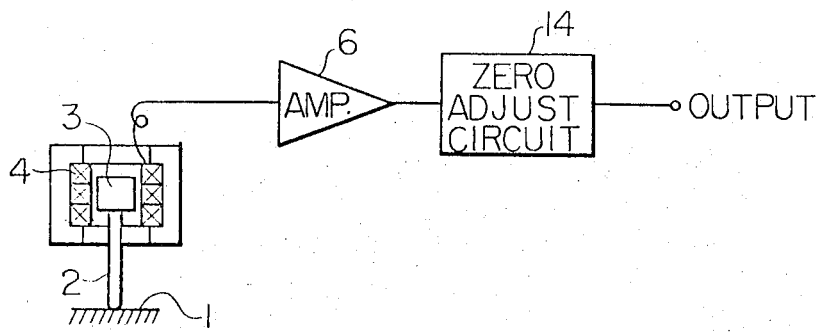
FIG. 2 is one example of an embodiment of an apparatus for automatically adjusting the zero point of the present invention.

Referring to FIG. 2 of the present invention, the feeler 2 is placed on the work 1, and an electrical signal which is proportional to the displacement $e_0$ of the feeler 2 is applied to an amplifier 6, whose output is applied to a zero adjust circuit 14. The input of the zero adjust circuit is the voltage $ae_0$, where $a$ is the amplification factor of the amplifier 6, which is proportional to the displacement of the feeler 2.

Figure 3A:
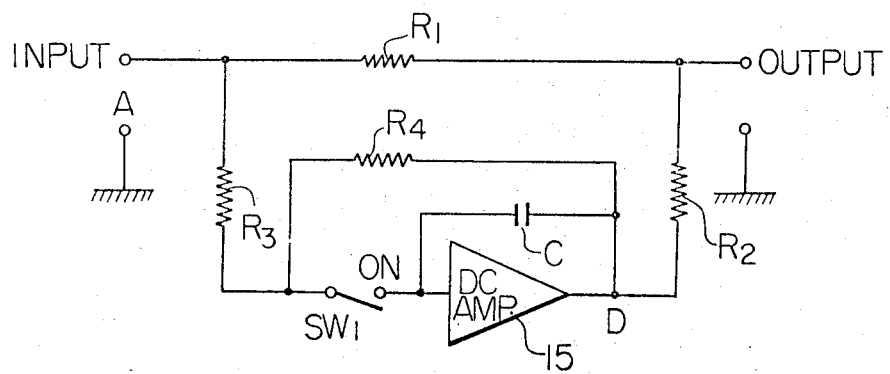
FIGS. 3A and 3B are circuit diagrams of the zero adjust circuit of FIG. 2.

One example of the zero adjust circuit 14 is shown in FIG. 3A. Referring to this figure, an input terminal A is connected via a resistor $R_1$ to an output terminal B, and also via a resistor $R_3$ to a switch $SW_1$. The other terminal of the switch $SW_1$ is connected to a DC amplifier 15 having high input impedance and high gain whose output is connected via a resistor $R_2$ to the output terminal B. And the output of the amplifier 15 is also fed back via a capacitor C to the input terminal of the amplifier 15 and further the output of the amplifier 15 is fed via a resistor $R_4$ to the connection point of the resistor $R_3$ and the switch $SW_1$. The other terminals of the input and output are connected to ground.

In the circuit shown in FIG. 3A, for the purpose of analysis, we assume firstly that the input source impedance and the output load impedance are both zero. Using the work having the standard dimension, when the switch SW is closed and the input voltage $ae_0$ is applied to the input terminal A of the zero adjustment circuit, the voltage $E_D$ at the output D of the DC amplifier 15 is:

$$E_D = -(R_4/R_3) ae_0$$

then the voltage $E_B$ at the output terminal B is $$E_B = [R_2/(R_1+R_2)] ae_0 - R_1/(R_1+R_2)] \cdot (R_4/R_3) ae_0$$
$$= [ae_0/(R_1+R_2)R_3](R_2R_3 - R_1R_4) \quad (1)$$

Therefore, if the following relation exists between resistors $R_1$, $R_2$, $R_3$ and $R_4$ in FIG. 3A.

$$R_2R_3 = R_1R_4 \quad (2)$$

$E_B = 0$ clearly from Equation (1). As mentioned above, the output voltage is set to zero value by closing the switch $SW_1$. Next, because the voltage between both terminals of the capacitor C is unchanged after opening the switch $SW_1$, the output voltage $E_D$ of the amplifier 15 is also unchanged. Next, the work having the standard dimension is substituted by a work to be measured, the displacement of the feeler 2 is changed from $e_0$ to $e_1$, the input voltage of the zero adjustment circuit becomes $ae_1$. Then the voltage $E_B$ at the output terminal B is $$E = [R_2/(R_1+R_2)] ae_1 - [R_1/(R_1+R_2)] \cdot (R_4/R_3) ae_0$$
$$= [a/(R_1+R_2)R_3](R_2R_3e_1 - R_1R_4e_0)$$

inserting Equation (2) into this equation, $$E_B = [R_2/(R_1+R_2)](e_1 - e_0) \quad (3)$$

As indicated in Equation (3), it is clear that an output voltage proportional to the deviation from the standard dimension appears at the output terminal.

Figure 3B:
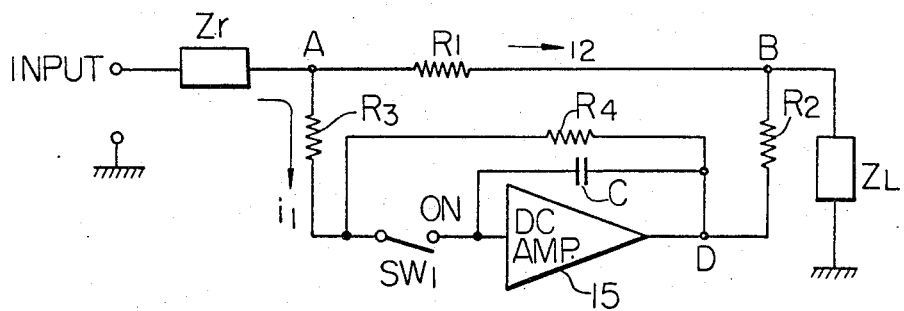

Considering now a source impedance of $Z_r$ and a load impedance of $Z_L$, as shown in FIG. 3B, when the switch $SW_1$ is closed, the relations connecting the input voltage $E_A$ on the input terminal of the zero adjust circuit, the output voltage $E_D$ at the amplifier 15 and the output voltage $E_B$ at the output terminal B are:

$$E_D = -(R_4/R_3) E_A \quad (4)$$

and $$E_B = E_A[(R_2//Z_L)/(R_1 + R_2//Z_L)] + E_D [(R_1//Z_L)/(R_2 + R_1//Z_L)] \quad (5)$$

inserting Equation (4) into Equation (5) and rearranging, we have, $$E_B = [E_ZZ_L(R_2R_3 - R_1R_4)]/R_3[R_1R_2 + Z_L(R_1 + R_2)] \quad (6)$$

when the output voltage is $ae_0$, as in the case of the work having a standard dimension the relation between $E_A$ and $ae_0$ is:

$$E_A = Z_{in}/(Z_r + Z_{in}) ae_0 \quad (7)$$

wherein $Z_{in}$ is the input impedance of the zero adjust circuit when the switch $SW_1$ is closed. Inserting Equation (7) into Equation (6), the following equation is obtained.

$$E_B = [Z_{in}Z_L(R_2R_3 - R_1R_4)]/\{(Z_r + Z_{in})[R_1R_2 + Z_L(R_1 + R_2)]R_3\} ae_0 \quad (8)$$

As is clear from this Equation, when the relation $$R_2R_3 = R_1R_4$$

holds, the output voltage $E_B$ when the switch $SW_1$ is closed becomes zero independent of the signal source impedance $Z_r$ and the load impedance $Z_L$. Next, when the switch $SW_1$ is opened, the voltage between the two terminals of the capacitor is unchanged and therefore the voltage $E_D$ at the output terminal D of the amplifier 15 is also unchanged. Therefore, the current $i_1$ in the resistor $R_3$ and the current $i_2$ in the resistor $R_1$ also remain unchanged. Then the output $ae_1$ when the work to be measured is positioned is $$ae_1 = a(e_2 = e_0)$$

wherein $$e_2 = e_1 - e_0$$

As the adjustment is carried so that the output voltage becomes zero for the input voltage $ae_0$, the output voltage $E_B$ for the input voltage $ae_1$ is:

$$E_B = R_2Z_L/[R_1R_2 + Z_L(R_1 + R_2)] \cdot (Z_{int}/(Z_r + Z_{int})) ae_2$$
$$E_B = (aR_2Z_L)/[R_1R_2 + Z_L(R_1 + R_2)] \cdot (Z_{int}/(Z_r + Z_{int})) (e_1 - e_0) \quad (9)$$

wherein $Z_{int}$ is the input impedance at the terminals A of the automatic zero adjust circuit when the switch $SW_1$ is closed. As is clear from Equation (9), the output voltage $E_B$ which is proportional to the deviation of the dimension of the work to be measured from the standard dimension is obtained at the terminal B independent of the signal source impedance $Z_r$ and the load impedance $Z_L$.

Figure 4:
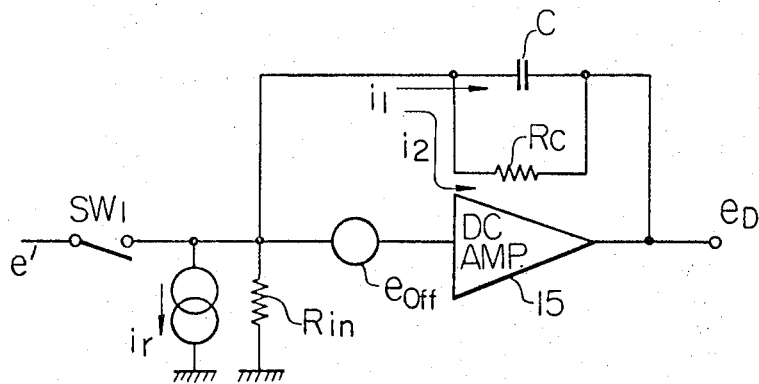
FIG. 4 is a circuit diagram of the memory circuit in FIG. 3A.

FIG. 4 shows an equivalent circuit diagram of the memory circuit in FIG. 3A. Referring to FIG. 4, the meaning of the symbols is as shown below.

$e_{off}$: Input offset voltage of the amplifier 15
$R_{in}$: Input resistance of the amplifier 15
$i_r$: Input leakage current of the amplifier 15
C: Capacitance of the memory condenser C
$R_c$: Leakage resistance of the memory capacitor C
15: DC amplifier Referring to FIG. 4, $$e' - e_D = R_{in}(i_l + i_2) + i_2R_0 \quad (10)$$

$$e' - e_D = R_{in}(i_l + i_2) + 1/C \int i_l \, dt \quad (11)$$

$$e_0 = -G[e' - R_{in}(i_l + i_2) + e_{off}] \quad (12)$$

wherein
$$e' = R_{in}i_r.$$

From Equations (10), (11) and (12)

$$i_1 = \frac{C_1 \varepsilon^{-\frac{t}{CR''}} - (e' + e_{off})}{-(GR_{in} + R_c)} \quad (13)$$

wherein
$$R'' = (GR_{in} \cdot R_c)/(GR_{in} + R_c) \cdot -t/GR$$
$$i_2 \approx C_1 e/GR_{in} \quad (14)$$

Inserting Equations (13) and (14) into Equation (10), $e_D$ is:

$$e_D = -C_1 \varepsilon^{-\frac{t}{CR''}} \left\{ \frac{1}{G} - \frac{R_{in} + R_c}{GR_{in} + R_c} \right\} - \frac{G(R_{in} + R_c)}{GR_{in} + R_c}(e' + e_{off}) + e' \quad (15)$$

In Equation (15) putting $e_D = e_{D1}$ then when $t = 0$, $C_1$ is:

$$C_1 \approx 1/R_c[e_{D1}(GR_{in} + R_c) + G\{e'R_c + e_{off}(R_{in} + R_c)\}]$$

Inserting this expression for $C_1$ into Equations (15) we have, $$e_D = e_{D1} \varepsilon^{-\frac{t}{CR''}} + \left\{ \frac{e'R_c + e_{off}(R_{in} + R_c)}{GR_{in} + R_c} \right\}(\varepsilon^{-\frac{t}{CR''}} - 1) \quad (16)$$

In amplifiers and capacitors usually sold in the market, the following values are present.

$G \approx 10^4$; $R_{in} \approx 10^{16}$ ($\Omega$); $R_c \approx 10^{10}$ ($\Omega$); $C \approx 10^{-6}$ f; $e_{off} \approx 3 \times 10^{-3}$ ($V$); $i_r \approx 10^{-10}$ ($A$).

Using these values, the time $t_1$ for which the value $e_{D1}$ in Equation (16) decreases by 1 percent can be obtained as follows:

$$e_D = e_{D1}(1 - 0.01)$$

$$= e_{D1}\varepsilon^{-\frac{t_1}{CR''}} + \frac{106}{1000}\varepsilon^{-\frac{t_1}{CR''}} - \frac{106}{1000}$$

$$= \varepsilon^{-\frac{t_1}{CR''}}(e_{D1} + \frac{106}{1000}) - \frac{106}{1000}$$

$$\therefore (0.99 e_{D1} + \frac{106}{1000})/(e_{D1} + \frac{106}{1000}) = \varepsilon^{-\frac{t_1}{CR''}} \quad (18)$$

When the value of $e_D$ in Equation (18) is selected to be as large as possible, the accuracy of the memory is increased. To this fact, the time $t_1$ when the value of $e_{D1}$ is fixed at 5V is $$\varepsilon^{-t_1/CR''} \approx 0.9988$$

$$t_1 = -10^4 \log_\varepsilon 0.9988 \approx 20 \text{ (sec)}$$

As is clear from Equations (17) and (18), the time $t_1$ is little affected by the values of $i_r$, $R_{in}$, $C_{off}$ and $G$. When a large value specially selected is adopted for the value of $R_c$, such as $R_c = 10^{11}$ ($\Omega$), $$t_1 = -10^5 \log_\varepsilon 0.992 \approx 800 \text{ (sec)}$$

The response time of the zero adjust circuit shown in FIG. 3A will be analyzed. Referring to this figure, when the voltage of the input terminal of the zero adjust circuit is $ae_0$, the time that the voltage at the input terminal takes from the closing of the switch $SW_1$ to fall to zero value can be obtained from the following equation. The voltage $E_D$ at the output terminal D of the amplifier 15 is:

$$E_D = ae_0 [GR/(GR_3 + R_4)] (\varepsilon^{-t/CR} - 1) \quad (19)$$

wherein $R = GR_3R_4/(GR_3 + R_4)$

The voltage $E_D$ at the output D of the DC amplifier 15 when the voltage $E_B$ at the output terminal B of the automatic zero adjust circuit becomes zero is:

$$E_D = -ae_0 (R_2/R_1) \quad (20)$$

In Equation (20), the voltage $E_{D1}$ which corresponds to 99.9 percent of $-ae_0(R_2/R_1)$ i.e., of $E_D$ is:

$$E_{D1} = -ae_0(R_2/R_1)(1 - 0.001) \quad (21)$$

Inserting Equation (21) into Equation (19), $$-ae_0 \frac{R_2}{R_1}(1 - 0.001) = \frac{GR_4}{GR_3 + R_4}(\varepsilon^{-\frac{t}{GR_3+R_4}C} - 1)$$

As selected generally $GR_3 >> R_4$ $\therefore -ae_0(1 - 0.001) \approx \varepsilon^{-t/R_4C} - 1$ wherein $R_1R_1 = R_2R_3$ when $ae_0$ is the common maximum value 10 V, the capacitor is 1$\mu$ F, and the resistor $R_4$ is 10 $k\Omega$, $$-8.99 = \varepsilon^{-t/10^{-3}}$$

then, the time $t$ which makes $E_D = E_{D1}$ is $$t = 2 \text{ (m sec)} \quad (22)$$

As is clear from Equations (21) and (22), the response time of the zero adjust circuit can be adjusted in a range of 0.1 percent of the output voltage $E_B$ and with (17)

a response time of 2 milliseconds. This is a great improvement over the conventional methods using servo-mechanisms.

Figure 6:
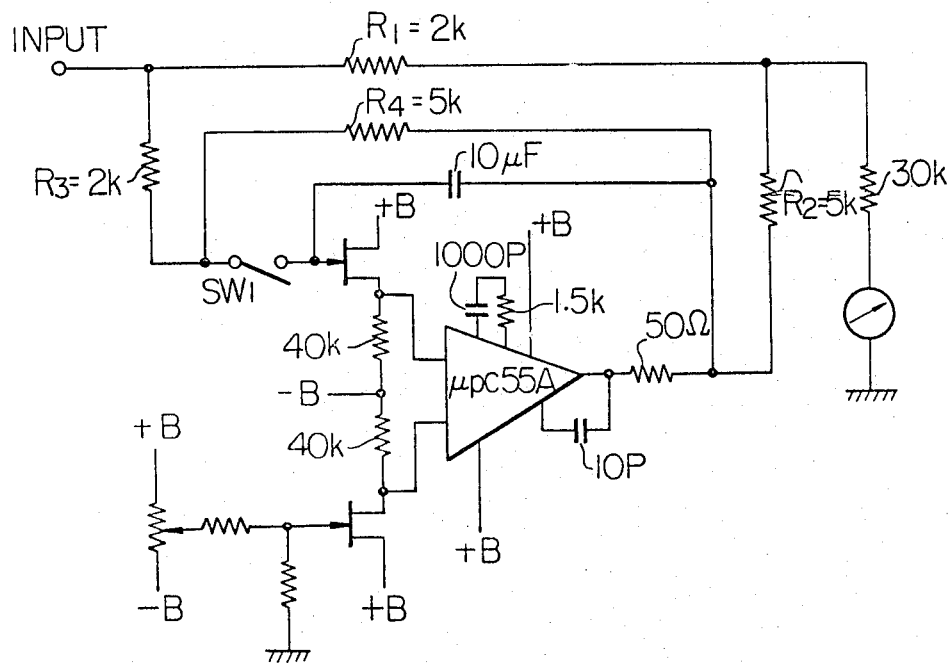
FIG. 6 is a detailed circuit diagram of FIG. 3A.

FIG. 6 is a detailed circuit diagram of the block diagram shown in FIG. 3A. Referring to FIG. 6, an integrating circuit $\mu$Pc55A is used as a high gain amplifier, and field effect transistors are used in the input stages.

Figure 5:
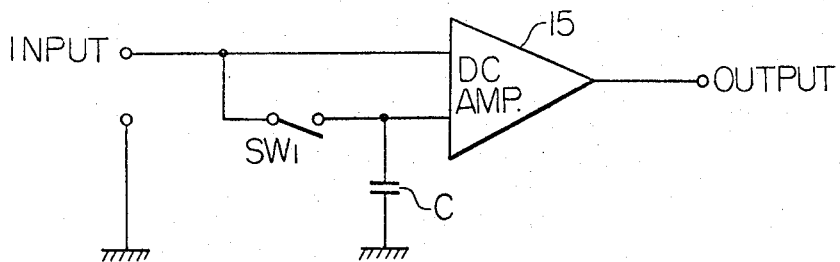
FIG. 5 is another example of the zero adjust circuit.

FIG. 5 shows another embodiment of the present invention. Referring to this figure, when the measurement is carried out for the work having the standard dimension, by closing the switch $SW_1$, the capacitor C is charged by the input voltage $ae_0$ applied to the zero adjust circuit. At this time, two identical input voltages $ae_0$ are applied respectively to the two input terminals of a differential amplifier 15, and the output of the amplifier becomes zero. The capacitor C maintains the voltage $ae_0$ proportional to the standard dimension after the switch $SW_1$ is opened. Next, the work to be measured is positioned, an input voltage $ae_0$ which is proportional to the deviations $e_1$ of the measuring element is applied to the input terminal of the zero adjust circuit. As mentioned above, the capacitor C maintains the voltage $ae_0$, then the output voltage of the differential amplifier 15 becomes.

$$G(ae_1 - ae_0) = Ga(e_1 - e_0)$$

Thus an output voltage proportional to the deviation from the standard value is obtained at the output terminal.

The above-mentioned explanation is given for the case where the measurement is carried out by converting a mechanical quantity into an electrical quantity. However, the same effect can be also obtained where, in an air switch for example, a displacement quantity is converted to a variation in air pressure and said converted value is further converted to an electrical value.

As mentioned above, according to the present invention, the measurement can be carried out as shown in FIG. 3A or FIG. 5 where (a) the quantity to be measured is converted to an electrical quantity, (b) an electrical quantity of a standard value is stored in analog form in the capacitor, (c) the electrical quantity to be measured is compared with said standard value stored in said capacitor.

What is claimed is:

1. Apparatus for adjusting the zero point automatically in the measuring apparatus which includes a means for converting a quantity of a mechanical displacement into an electrical quantity, comprising an input terminal connected to an output terminal via a resistor $R_1$, said input terminal being connected via a resistor $R_3$ to one terminal of a switching means, the other terminal of said switching means being connected to a DC amplifier having a high input impedance and a high gain, the output of said amplifier being connected via a resistor $r_4$ to said one terminal of said switching circuit and via a capacitor C to the input of said DC amplifier and via a resistor $R_2$ to said output terminal, remaining terminals of said input terminal and output terminal are connected to ground, and said resistor $R_1$, $R_2$, $R_3$ and $R_4$ being selected so as to satisfy the relation $R_2 R_3 = R_1 R_4$.

2. A system for automatically adjusting the zero point in a measuring apparatus which converts a quantity of a mechanical displacement into an electrical quantity comprising a zero adjust circuit comprising a circuit input and a circuit output, means for applying a standard voltage from said measuring apparatus to said circuit input of said zero adjust circuit, the standard voltage corresponding to a work having a standard dimension, said zero adjust circuit further comprising a first resistor connected between said circuit input and said circuit output, a third resistor connected between said circuit input and a first side of switching means, said second side of said switching means connected to an input of a DC amplifier, a fourth resistor connected between an output of said amplifier and said first side of said switching means, a second resistor connected between said amplifier output and said circuit output, a capacitor connected between said amplifier input and output for storing said standard voltage in said capacitor after opening said switching means, and means for applying a measuring voltage from said measuring apparatus whereby said measuring voltage is adjustable with respect to said stored standard voltage so that the value of said measuring voltage becomes equal to that of said standard voltage.

* * * * *